United States Patent
Kobayashi et al.

(10) Patent No.: US 6,403,017 B1
(45) Date of Patent: Jun. 11, 2002

(54) PROCESS FOR PRODUCING MN-ZN FERRITE

(75) Inventors: Osamu Kobayashi; Osamu Yamada; Koji Honda; Shunji Kawasaki, all of Asaba-cho (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 09/442,389

(22) Filed: Nov. 18, 1999

(30) Foreign Application Priority Data

Apr. 5, 1999 (JP) .......................................... 11-097676
Oct. 4, 1999 (JP) .......................................... 11-283067

(51) Int. Cl.[7] .............................................. C04B 35/38
(52) U.S. Cl. ..................... 264/613; 264/611; 264/612; 252/62.56; 252/62.59; 252/62.62
(58) Field of Search ................................. 264/611, 612, 264/613; 252/62.56, 62.59, 62.62

(56) References Cited

U.S. PATENT DOCUMENTS 4,097,392 A * 6/1978 Goldman et al. ........... 264/613
4,963,281 A   10/1990 Togane
6,113,843 A * 9/2000 Aoki et al. .................. 264/613
6,296,791 B1 * 10/2001 Kobayashi .................. 264/613

FOREIGN PATENT DOCUMENTS

| DE | 1177538   | 9/1964 |
| EP | 0707323   | 4/1996 |
| GB | 1472539   | 5/1977 |
| JP | 5-198419  | 8/1993 |
| JP | 7-230909  | 8/1995 |
| JP | 10-208926 | 8/1998 |

* cited by examiner

Primary Examiner—James Derrington
(74) Attorney, Agent, or Firm—Oliff & Berridge, PLC

(57) ABSTRACT

A process for producing Mn—Zn ferrite having large electrical resistance and being durable to the use in high frequency region exceeding 1 MHz easily and at low cost is disclosed. The process comprises pressing a mixed powder comprising a composition of 44.0 to 50.0 mol % of $Fe_2O_3$, 4.0 to 26.5 mol % of ZnO, 0.1 to 8.0 mol % of at least one member selected from the group consisting of $TiO_2$ and $SnO_2$, and the remainder being MnO, and if desired 0.1 to 16.0 mol % of CuO, sintering the resulting green compact in the air or an atmosphere containing an appropriate amount of oxygen, and then cooling the green compact, thereby securing the estimated high initial permeability even in a high frequency region of 1 MHz or more.

4 Claims, 1 Drawing Sheet

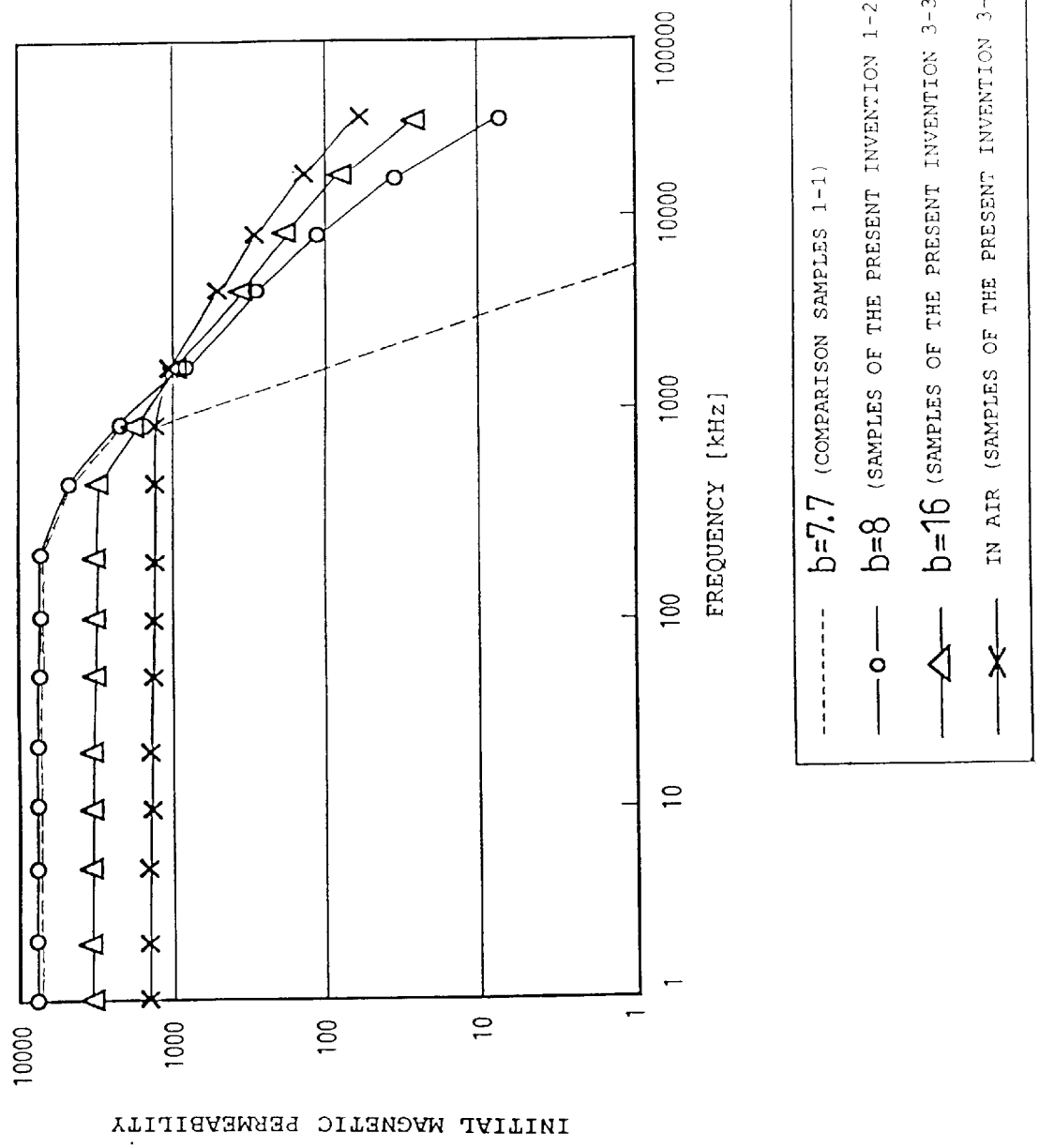

PROCESS FOR PRODUCING MN-ZN FERRITE

BACKGROUND OF THE INVENTION

1. Field of the Invention

The present invention relates to a process for producing an oxide magnetic material having soft magnetism, particularly Mn—Zn ferrite. More particularly, the invention relates to a process for producing Mn—Zn ferrite which is suitable for use as low loss materials used in switching power supply transformer, flyback transformer or deflection yoke, various inductance elements, impedance elements for EMI countermeasure, electromagnetic wave absorbers, and the like.

2. Background of Related Art

There is Mn—Zn ferrite as the representative oxide magnetic material having soft magnetism. This Mn—Zn ferrite generally has a composition comprising basic components of more than 50 mol % of $Fe_2O_3$, 52 to 55 mol % of $Fe_2O_3$ on the average, 10 to 24 mol % of ZnO and the remainder being MnO. The Mn—Zn ferrite has conventionally been produced by mixing each raw material powder of $Fe_2O_3$, ZnO and MnO in predetermined proportion, forming the resulting mixture into a predetermined shape through each step of calcination, milling, component adjustment, granulation, pressing and the like, and then subjecting the green compact to sintering treatment such that the green compact is maintained at 1,200 to 1,400° C. for 3 to 4 hours in a reduced atmosphere having greatly decreased oxygen concentration by flowing of nitrogen gas. The reason for sintering in a reduced atmosphere is that since the green compact contains $Fe_2O_3$ in a large amount of 50 mol % or more, if it is sintered in the air, densification does not proceed sufficiently, and as a result, good soft magnetism is not obtained. Further, $Fe^{2+}$ to be formed by reduction of $Fe^{3+}$ has a positive crystal magnetic anisotropy, and therefore has the effect that it offsets a negative crystal magnetic anisotropy of $Fe^{3+}$, thereby increasing soft magnetism. However, if sintered in the air, formation of $Fe^{2+}$ by such a reduction reaction cannot be expected.

However, it is known that the densification depends on oxygen concentration at the time of temperature rising in sintering, and formation of $Fe^{2+}$ depends on oxygen concentration at the time of temperature dropping after sintering. Accordingly, if setting of oxygen concentration in sintering is mistaken, it is difficult to secure good soft magnetism. For this reason, conventionally the following equation (1) has been established experimentally, and oxygen concentration in sintering has been administered according to this equation (1).

$$\log Po_2 = -14{,}540/(T+273) + b \tag{1}$$

wherein T is temperature (° C.), $Po_2$ is oxygen concentration, and b is a constant. The term "oxygen concentration" in the present specification means the proportion of oxygen gas when the volume of all gases is set to 1, and has the same meaning as partial pressure of oxygen. The numerical value of about 7–8 has conventionally been employed as the constant b. The constant b being 7–8 means that oxygen concentration during sintering must be controlled to a narrow range, and due to this fact, there have conventionally been the problems that sintering treatment is very complicated and production cost is very high.

On the other hand, where Mn—Zn ferrite is used as a magnetic core material, eddy current flows with becoming a frequency used high, and loss by such an eddy current increases. Therefore, in order to raise the upper limit of the frequency that can be used as a magnetic core material, it is necessary to make its electrical resistance large as much as possible. However, there have been the problems that the electrical resistance in the above-described conventional Mn—Zn ferrite is a value smaller than 1 Ωm due to enjoyment of electron between $Fe^{3+}$ and $Fe^{2+}$ (interionic) as mentioned above, frequency that can be used is up to about several hundred kHz, and initial permeability remarkably decreases in a high frequency region exceeding 1 MHz, resulting in losing properties as soft magnetic material.

SUMMARY OF THE INVENTION

The present invention has been made in view of the above-described conventional problems. An object of the present invention is to provide a production process which can easily and inexpensively obtain Mn—Zn ferrite which has large electrical resistance and is sufficiently durable to the use in a high frequency region exceeding 1 MHz.

The above object can be achieved by the following aspects.

According to a first aspect of the present invention, there is provided a process for producing Mn—Zn ferrite, which comprises pressing a mixed powder comprising components adjusted so as to have a composition of 44.0 to 50.0 mol % of $Fe_2O_3$, 4.0 to 26.5 mol % of ZnO, 0.1 to 8.0 mol % of at least one member selected from the group consisting of $TiO_2$ and $SnO_2$, and the remainder being MnO, sintering the resulting green compact in the air, and then cooling the green compact in the air.

According to a second aspect of the present invention, there is provided a process for producing Mn—Zn ferrite, which comprises pressing a mixed powder comprising components adjusted so as to have a composition of 44.0 to 50.0 mol % of $Fe_2O_3$, 4.0 to 26.5 mol % of ZnO, 0.1 to 8.0 mol % of at least one member selected from the group consisting of $TiO_2$ and $SnO_2$, 0.1 to 16.0 mol % of CuO and the remainder being MnO, sintering the resulting green compact in the air, and then cooling the green compact in the air like the first aspect of the present invention.

According to a third aspect of the present invention, there is provided a process for producing Mn—Zn ferrite, which comprises pressing a mixed powder comprising components adjusted so as to have a composition of 44.0 to 50.0 mol % of $Fe_2O_3$, 4.0 to 26.5 mol % of ZnO, 0.1 to 8.0 mol % of at least one member selected from the group consisting of $TiO_2$ and $SnO_2$, and the remainder being MnO, sintering the resulting green compact in an atmosphere having an oxygen concentration as defined by the following equation, and then cooling the green compact after sintering the same at a temperature up to at least 300° C.:

$$\log Po_2 = -14{,}540/(T+273) + b$$

wherein T is temperature (° C.), $Po_2$ is oxygen concentration, and b is a constant selected from the range of 6 to 21. In this case, if the temperature is lower than 300° C., since the reaction of oxidation and reduction can be disregarded without depending on the oxygen concentration, the adjustment of the atmosphere is sufficient such that the cooling after sintering advances to the point of 300° C.

According to a fourth aspect of the present invention, there is provided a process for producing Mn—Zn ferrite, which comprises pressing a mixed powder comprising components adjusted so as to have a composition of 44.0 to 50.0 mol % of $Fe_2O_3$, 4.0 to 26.5 mol % of ZnO, 0.1 to 8.0 mol % of at least one member selected from the group consisting of $TiO_2$ and $SnO_2$, 0.1 to 16.0 mol % of CuO and the remainder being MnO, sintering the resulting green compact in an atmosphere having an oxygen concentration as defined by the following equation, and then cooling the green compact after sintering the same at a temperature up to at least 300° C.:

$$\log Po_2 = -14,540/(T+273) + b$$

wherein T is temperature (° C.), $Po_2$ is oxygen concentration, and b is a constant selected from the range of 6 to 21. In this case, if the temperature is lower than 300° C., since the reaction of oxidation and reduction can be disregarded without depending on the oxygen concentration, the adjustment of the atmosphere is sufficient such that the cooling after sintering advances to the point of 300° C.

It is known that iron component in Mn—Zn ferrite is present in the form of $Fe^{3+}$ and $Fe^{2+}$, but Ti and Sn form $Fe^{2+}$ by receiving electron from $Fe^{3+}$. Therefore, $Fe^{2+}$ can be formed even by sintering in the air or an atmosphere containing an appropriate amount of oxygen by containing Ti and Sn.

The first to fourth aspects of the present invention make it possible to obtain good soft magnetism by that the content of $TiO_2$ and/or $SnO_2$ in the basic components is adjusted to 0.1 to 8.0 mol % to control the amount of $Fe^{2+}$ to be formed and optimize a co-existence ratio of ratio of $Fe^{3+}$ and $Fe^{2+}$, thereby canceling out positive and negative crystal magnetic anisotropy. Further, according to the first to fourth aspects of the present invention, since $Ti^{4+}$ and $Sn^{4+}$ having the stable number of valency are present in large amount, exchange of electrons between $Fe^{3+}$ and $Fe^{2+}$ is substantially inhibited, and as a result, an electrical resistance that is considerably larger than the conventional electrical resistance can be obtained (about $10^3$ times). However, if the content of $TiO_2$ and/or $SnO_2$ is less than 0.1 mol %, such an effect is small. On the other hand, if the content is larger than 8.0 mol %, the initial permeability decreases. For this reason, the content of $TiO_2$ and/or $SnO_2$ is adjusted to the range of 0.1 to 8.0 mol %.

In the first to fourth aspects of the present invention, since the content of $Fe_2O_3$ is suppressed to 50 mol % or less, even if sintered in the air or an atmosphere containing an appropriate amount of oxygen, densification proceeds sufficiently, so that the desired soft magnetism is obtained. However, if the content of $Fe_2O_3$ is too small, it results in decrease ininitial permeability. Therefore, $Fe_2O_3$ should contain in an amount of at least 44.0 mol %.

ZnO affects Curie temperature or saturation magnetization. If the content of ZnO is too large, Curie temperature lowers, resulting in practical problem. On the other hand, if the content of ZnO is too small, saturation magnetization decreases. For this reason, the content of ZnO is adjusted to the range of 4.0 to 26.5 mol %.

In the second and fourth aspects of the present invention, CuO is contained as described above. This CuO has the effect which enables low temperature sintering. However, if the content of CuO is too small, the above-described effect is small. On the other hand, if the content is too large, the initial permeability decreases. Therefore, the content of CuO is adjusted to the range of 0.1 to 16.0 mol %.

The first to fourth aspects of the present invention can contain a slight amount of at least one member selected from the group consisting of CaO, $SiO_2$, $ZrO_2$, $Ta_2O_5$, $HfO_2$, $Nb_2O_5$ and $Y_2O_3$ as additives. Those additives have the function to make grain boundary highly resistant.

Further, at least one member selected from the group consisting of $V_2O_5$, $Bi_2O_3$, $In_2O_3$, PbO, $MoO_3$ and $WO_3$ can be contained as the additives. Those additives each are oxides having low melting point and have the function to accelerate sintering.

Additionally, at least one of $Cr_2O_3$ and $Al_2O_3$ may further be contained as the additive. Those additives have the function to improve temperature characteristics of initial permeability.

In the third and fourth aspects of the present invention, cooling after sintering is conducted in an atmosphere having an oxygen concentration determined using an optional value within the range of 6 to 21 as the constant b in the above-described equation (1). If a value larger than 21 is selected as the constant b in the equation (1), the atmosphere is substantially the same atmosphere as the air, and thus it is meaningless to define the oxygen concentration. Further, in order to increase the initial permeability at low frequency of Mn—Zn ferrite to be obtained, it is desirable to select a value as small as possible for the constant b. However, if the value is smaller than 6, electrical resistance becomes too small, and as a result, the initial permeability in high frequency region deteriorates. Therefore, the constant b is set to 6 or more.

BRIEF DESCRIPTION OF THE DRAWING

FIG. 1 is a graph showing frequency characteristics to initial permeability in Samples of the present invention and Comparison Samples.

DETAILED DESCRIPTION OF THE PREFERRED EMBODIMENTS

The process for producing Mn—Zn ferrite comprises weighing each raw material of $Fe_2O_3$, ZnO, $TiO_2$ and/or $SnO_2$, CuO, MnO and the like as main components in advance so as to become the predetermined respective proportion, mixing those to obtain a mixed powder, and if necessary, calcining and finely milling the mixed powder. The calcination temperature can be selected at an appropriate temperature within the temperature range of 850 to 950° C., although slightly varying depending on the objective composition. Further, the general-purpose ball mill can be used for fine milling of the mixed powder. If desired, powder of various additives as described above is added to and mixed with the fine mixed powder in the predetermined proportion to obtain the mixed powder having the objective components. After that, granulation and pressing are conducted according to the conventional process for producing ferrite, and sintering is further conducted at 900 to 1,300° C. Incidentally, for the granulation, a method of adding a binder such as polyvinyl alcohol, polyacrylamide, methyl cellulose, polyethylene oxide, glycerin or the like can be used, and for the pressing, for example, a method in which pressing is conducted by applying a pressure of 80 MPa or more can be used.

The above-described sintering and cooling after sintering may be conducted in the air or in an atmosphere having an oxygen concentration defined based on the above-described equation (1) wherein the constant b is within the range of 6 to 21. However, in a case where those are conducted in an atmosphere containing oxygen, it is desirably to control oxygen concentration by flowing of an inert gas such as nitrogen gas in a sintering furnace. In this case, the constant bin the equation (1) can select an optional value within a wide range of 6 to 21, and this makes it possible to easily control the oxygen concentration.

The Mn—Zn ferrite thus obtained contains $TiO_2$ and/or $SnO_2$ as the main components. Therefore, electrical resistance of the Mn—Zn ferrite greatly increases as compared with that of the conventional Mn—Zn ferrite (about $10^3$ times).

Further, the limit of initial permeability $\mu$ in soft magnetic ferrite is generally in inversely proportional to a frequency f (MHz) in which the ferrite is used, and is estimated by the value given by the following equation (2):

$$\mu = K/f (K=1,500-2,000) \quad (2)$$

According to the Mn—Zn ferrite of the present invention, the initial permeability $\mu$ of 1,500 to 2,000 at 1 MHz and 300 to 400 at 5 MHz can be obtained as estimated. Thus, the Mn—Zn ferrite according to the present invention is suitable for use as magnetic core materials and electromagnetic wave absorbers for high frequency exceeding 1 MHz.

The present invention is described in more detail by referring to the following Examples, but it should be understood that the invention is not limited thereto.

EXAMPLE 1

Each raw material powder was mixed with a ball mill so as to obtain a composition such that $Fe_2O_3$ was 48.0 mol %, $TiO_2$ or $SnO_2$ was 2.0 mol %, and the remainder was MnO and ZnO in a molar ratio of 26:25. The resulting mixture was calcined in the air at 900° C. for 2 hours, and then milled with a ball mill for 20 hours to obtain a mixed powder. Next, this mixed powder was subjected to component adjustment so as to have the above-described composition, and then mixed with a ball mill for 1 hour. Polyvinyl alcohol was added to the mixed powder, and the resulting mixture was granulated and then pressed into a toroidal core (green compact) having an outer diameter of 18 mm, an inner diameter of 10 mm and a height of 4 mm under a pressure of 80 MPa. The green compact was introduced in a sintering furnace. Atmosphere in the furnace was adjusted so as to be oxygen concentration to be obtained when the constant b in the equation (1) was 8 by flowing nitrogen gas, and sintering at 1,300° C. for 3 hours and cooling after sintering were conducted to obtain Samples of the present invention 1-2 and 1-3 as shown in Table 1 below.

For the sake of comparison, each raw material powder was mixed with a ball mill so as to obtain a composition such that $Fe_2O_3$ was 52.5 mol %, MnO was 24.2 mol % and ZnO was 23.3 mol %. The resulting mixture was calcined in the air at 900° C. for 2 hours, and then milled with a ball mill for 20 hours to obtain a mixed powder. Next, this mixed powder was subjected to component adjustment so as to have the above-described composition, 0.05 mass % of CaO was added as an additive, and the resulting mixture was then mixed with a ball mill for 1 hour. Next, polyvinyl alcohol was added to the mixed powder, and the resulting mixture was granulated and then pressed into a toroidal core (green compact) having an outer diameter of 18 mm, an inner diameter of 10 mm and a height of 4 mm under a pressure of 80 MPa. The green compact was introduced in a sintering furnace. Atmosphere in the furnace was adjusted so as to be oxygen concentration obtained when the constant b in the equation (1) was 7.7, and sintering at 1,300° C. for 3 hours and cooling after sintering were conducted to obtain Comparison Sample 1-1 containing $Fe_2O_3$ in an amount larger than 50 mol % as the same as conventional.

On each of Samples 1-1 to 1-3 thus obtained, final components were confirmed by fluorescent X ray analysis, and initial permeability and electrical resistance at 100 kHz, 1 MHz and 5 MHz were measured. The results obtained are shown in Table 1 below.

TABLE 1

| Sample No. | Classification | Basic component composition (mol %) | | | | | Initial permeability | | | Electrical resistance |
| | | $Fe_2O_3$ | MnO | ZnO | $TiO_2$ | $SnO_2$ | 100 kHz | 1 MHz | 5 MHz | ($\Omega$m) |
|---|---|---|---|---|---|---|---|---|---|---|
| 1-1 | Comparison | 52.5 | 24.2 | 23.3 | — | — | 7010 | 1380 | 1 | $1.5 \times 10^{-1}$ |
| 1-2 | Invention | 48.0 | 25.5 | 24.5 | 2.0 | — | 7030 | 1930 | 310 | $6.5 \times 10^3$ |
| 1-3 | Invention | 48.0 | 25.5 | 24.5 | — | 2.0 | 7010 | 1940 | 300 | $6.2 \times 10^3$ |

From the results shown in Table 1 above, Samples of the present invention 1-2 and 1-3 in which $Fe_2O_3$ is 50.0 mol % or less have a large electrical resistance of the order of $10^4$ as compared with Comparison Sample 1-1 in which $Fe_2O_3$ is more than 50.0 mol %, and corresponding to the large electrical resistance, the initial permeability at a high frequency region of 1 MHz and 5 MHz is also remarkably high. On the other hand, the initial permeability of Comparison Sample 1-1 is 1 at a frequency of 5 MHz. Consequently, Comparison Sample 1 entirely loses properties as soft magnetic material.

EXAMPLE 2

Each raw material powder was mixed with a ball mill so as to obtain a composition such that $Fe_2O_3$ was 48.0 mol %, $TiO_2$ was 2.0 mol %, CuO was 0–20.0 mol %, and the remainder was MnO and ZnO in a molar ratio of 26:25. After that, the resulting mixture was calcined in the air at 900° C. for 2 hours, and then milled with a ball mill for 20 hours to obtain a mixed powder. Next, this mixed powder was subjected to component adjustment so as to have the above-described composition, and then mixed with a ball mill for 1 hour. Next, polyvinyl alcohol was added to the mixed powder, and the resulting mixture was granulated and then pressed into a toroidal core having an outer diameter of 18 mm, an inner diameter of 10 mm and a height of 4 mm under a pressure of 80 MPa. Each of the green compacts was introduced in a sintering furnace. Atmosphere in the furnace was adjusted so as to be oxygen concentration to be obtained when the constant b in the equation (1) was 8 by flowing nitrogen gas, and sintering at 900 to 1,300° C. for 3 hours and cooling after sintering were conducted to obtain Samples 2-1 to 2-4 as shown in Table 2 below.

On each of Samples 2-1 to 2-4 thus obtained, final components were confirmed by fluorescent X-ray analysis, and initial permeability at 1 MHz was measured. The results obtained are shown in Table 2 below.

TABLE 2

| Sample No. | Classification | Basic component composition (mol %) | | | | | Initial permeability at each sintering temperature | | | | |
|---|---|---|---|---|---|---|---|---|---|---|---|
| | | $Fe_2O_3$ | MnO | ZnO | $TiO_2$ | CuO | 1300° C. | 1200° C. | 1100° C. | 1000° C. | 900° C. |
| 2-1 | Invention | 48.0 | 25.5 | 24.5 | 2.0 | — | 1930 | 1080 | 640 | 310 | 90 |
| 2-2 | Invention | 48.0 | 21.4 | 20.6 | 2.0 | 8.0 | 1010 | 1230 | 1940 | 1130 | 730 |
| 2-3 | Invention | 48.0 | 17.3 | 16.7 | 2.0 | 16.0 | 740 | 1050 | 1370 | 1910 | 1200 |
| 2-4 | Comparison | 48.0 | 15.3 | 14.7 | 2.0 | 20.0 | 430 | 720 | 1060 | 1190 | 1120 |

From the results shown in Table 2, in Samples 2-1 (Samples of the present invention) which does not contain CuO at all, the sintering temperature must be set to high temperature of 1,200° C. or more in order to obtain high initial permeability of 1,000 or more, but in Samples 2-2 and 2-3 (Samples of the present invention) which contain an appropriate amount of CuO, high initial permeability of 1,000 or more is obtained even though the sintering temperature is set to low temperature of, for example, about 1,000° C. However, in Samples 2-4 (Comparison Samples) containing relatively large amount (20.0 mol %) of CuO, where high temperature sintering of 1,200° C. or more is conducted, the initial permeability greatly decreases, and also high permeability exceeding 1,500 is not obtained even though sintered at relatively low temperature (1,100° C.). Thus, it was apparent that an appropriate amount of CuO contained is effective to decrease the optimum sintering temperature and improve initial permeability at high frequency region.

of 5.5 to 21 by flowing nitrogen gas to obtain Samples 3-1 to 3-7 as shown in Table 3 below.

On each of Samples 3-1 to 3-7 thus obtained, final components were confirmed by fluorescent X ray analysis, and initial permeability and electrical resistance at 100 kHz, 1 MHz and 5 MHz were measured. The results obtained are shown in Table 3 below. Incidentally, it should be noted the results of Samples of the present invention 1-2 in Example 1 are also shown in Table 3. Further, on Samples of the present invention 3-3 and 3-5 obtained in Example 3, and Samples of the present invention 1-2 and Comparison Sample 1-1 obtained in Example 1, change of the initial permeability was examined by changing a frequency in wide range. The results obtained are shown in FIG. 1.

TABLE 3

| Sample No. | Classification | Basic component composition (mol %) | | | | | Constant | Initial permeability | | | Electrical resistance |
|---|---|---|---|---|---|---|---|---|---|---|---|
| | | $Fe_2O_3$ | MnO | ZnO | $TiO_2$ | CuO | b | 100 kHz | 1 MHz | 5 MHz | ($\Omega$m) |
| 3-1 | Comparison | 48.0 | 25.5 | 24.5 | 2.0 | — | 5.5 | 6820 | 940 | 70 | $4.9 \times 10^1$ |
| 1-2 | Invention | 48.0 | 25.5 | 24.5 | 2.0 | — | 8 | 7030 | 1930 | 310 | $6.5 \times 10^3$ |
| 3-2 | Invention | 48.0 | 25.5 | 24.5 | 2.0 | — | 6 | 7060 | 1440 | 220 | $1.7 \times 10^3$ |
| 3-3 | Invention | 48.0 | 25.5 | 24.5 | 2.0 | — | 16 | 3190 | 1790 | 370 | $1.0 \times 10^4$ |
| 3-4 | Invention | 48.0 | 25.5 | 24.5 | 2.0 | — | 21 | 1590 | 1560 | 380 | $2.2 \times 10^4$ |
| 3-5 | Invention | 48.0 | 25.5 | 24.5 | 2.0 | — | In air | 1590 | 1570 | 400 | $2.4 \times 10^4$ |
| 3-6 | Invention | 48.0 | 21.4 | 20.6 | 2.0 | 8.0 | 16 | 3190 | 1790 | 370 | $1.0 \times 10^4$ |
| 3-7 | Invention | 48.0 | 21.4 | 20.6 | 2.0 | 8.0 | In air | 1580 | 1560 | 400 | $2.4 \times 10^4$ |

EXAMPLE 3

Each raw material powder was mixed with a ball mill so as to obtain a composition such that $Fe_2O_3$ was 48.0 mol %, $TiO_2$ was 2.0 mol %, CuO was 0 or 8.0 mol % and the remainder was MnO and ZnO in a molar ratio of 26:25. After that, the resulting mixture was calcined in the air at 900° C. for 2 hours, and then milled with a ball mill for 20 hours to obtain a mixed powder. Next, this mixed powder was subjected to component adjustment so as to have the above-described composition, and then mixed with a ball mill for 1 hour. Next, polyvinyl alcohol was added to the mixed powder, and the resulting mixture was granulated and then pressed into a toroidal core having a outer diameter of 18 mm, an inner diameter of 10 mm and a height of 4 mm under a pressure of 80 MPa. After that, each of the green compacts was introduced in a sintering furnace. Sintering at 1,300° C. or 1,100° C. (1,100° C. was for only a green compact containing CuO) for 3 hours and cooling after sintering were conducted in the air or in an atmosphere which was adjusted so as to be oxygen concentration to be obtained when the constant b in the equation (1) was changed within the range From the results shown in Table 3 above, Samples of the present invention 3-2 to 3-4, 3-6 and 1-2 in which sintering was conducted in an atmosphere having oxygen concentration when the constant b in the equation was 6 or more, and Samples of the present invention 3-5 and 3-7 in which sintering was conducted in the air, each shows large electrical resistance, and according to this, the initial permeability at a high frequency region of 1 MHz and 5 MHz is also high. In particular, Samples of the present invention 3-5 and 3-7 in which sintering was conducted in the air show that both electrical resistance and initial permeability at high frequency region are high, as compared with the samples in which sintering was conducted in other atmosphere. On the other hand, Comparison Sample 3-1 in which sintering was conducted in an atmosphere having an oxygen concentration when the constant b was 5.5 shows that the initial permeability at high frequency region of 1 MHz and 5 MHz is the lowest.

Further, from the results shown in FIG. 1, Samples of the present invention 3-3, 3-5 and 1-2 and Comparison Sample 1-1 show that the initial permeability does not substantially change up to the frequency of about 500 kHz even if the frequency changes, whereas Comparison Sample 1-1 shows that the initial permeability rapidly drops if the frequency exceeds about 500 kHz, and the initial permeability decreases to 1 at the frequency of 5,000 kHz (5 MHz).

EXAMPLE 4

Each raw material powder was mixed with a ball mill so as to obtain a composition such that $Fe_2O_3$ was 48.0 mol %, $TiO_2$ was 2.0 mol %, CuO was 0 or 8.0 mol % and the remainder was MnO and ZnO in a molar ratio of 26:25. After that, the resulting mixture was calcined in the air at 900° C. for 2 hours, and then milled with a ball mill for 20 hours to obtain a mixed powder. Next, this mixed powder was subjected to component adjustment so as to have the above-described composition, and 0.05 mass % of $MoO_3$, 0.05 mass % of CaO and 0.10 mass % of $ZrO_2$ or 0.15 mass % of $Al_2O_3$ were added thereto as additives. The resulting mixture was then mixed with a ball mill for 1 hour. Next, polyvinyl alcohol was added to the mixed powder, and the resulting mixture was granulated and then pressed into a toroidal core having an outer diameter of 18 mm, an inner diameter of 10 mm and a height of 4 mm under a pressure of 80 MPa. Each of the green compacts was introduced in a sintering furnace. Sintering at 1,300° C. or 1,100° C. (1,100° C. was for only a green compact containing CuO) for 3hours and cooling after sintering were conducted in an atmosphere which was adjusted so as to be oxygen concentration to be obtained when the constant b in the equation (1) was 8 by flowing nitrogen gas to obtain Samples 4-1 to 4-4 as shown in Table 4 below.

On each of Samples 4-1 to 4-4 thus obtained, final components were confirmed by fluorescent X-ray analysis, and initial permeability and electrical resistance at 100 kHz, 1 MHz and 5 MHz were measured. The results obtained are shown in Table 4 below.

TABLE 4

| Sample No. | Classifi-cation | Basic component composition (mol %) | | | | | Additive (mass %) | Initial permeability | | |
|---|---|---|---|---|---|---|---|---|---|---|
| | | $Fe_2O_3$ | MnO | ZnO | $TiO_2$ | CuO | | 100 kHz | 1 MHz | 5 MHz |
| 4-1 | Invention | 48.0 | 25.5 | 24.5 | 2.0 | — | $MoO_3$ 0.05 | 7050 | 1920 | 300 |
| 4-2 | Invention | 48.0 | 25.5 | 24.5 | 2.0 | — | CaO 0.05 | 7020 | 1930 | 330 |
| 4-3 | Invention | 48.0 | 21.4 | 20.6 | 2.0 | 8.0 | $ZrO_2$ 0.10 | 7000 | 1950 | 360 |
| 4-4 | Invention | 48.0 | 21.4 | 20.6 | 2.0 | 8.0 | $Al_2O_3$ 0.15 | 7020 | 1900 | 310 |

From the results shown in Table 4 above, it is found that high initial permeability is obtained at each frequency level by adding slight amounts of $MoO_3$, CaO, $ZrO_2$, $Al_2O_3$ and the like as additives, and thus those additives contribute to improvement of the initial permeability.

As described above, according to the process for producing Mn—Zn ferrite of the present invention, Mn—Zn ferrite which are durable to the use in wide frequency region of from a low frequency region of about 100 kHz to a high frequency region exceeding 1 MHz can be obtained in a stable manner even if sintered in the air or an atmosphere containing an appropriate amount of oxygen, by using a mixed powder containing specific components such that $TiO_2$ or $SnO_2$ is contained and the amount of $Fe_2O_3$ is suppressed to 50 mol % or less. Further, since sintering does not require complicated administration of atmosphere, cost required for the sintering is decreased, making it possible to provide inexpensive Mn—Zn ferrite useful for use in magnetic core materials, electromagnetic wave absorbers, and the like.

In particular, when CuO is contained in a mixed powder, low temperature sintering is possible. Consequently, cost required for the sintering is further decreased, and this greatly contributes to inexpensive production of Mn—Zn ferrite.

What is claimed is:

1. A process for producing Mn—Zn ferrite, which comprises pressing a mixed powder consisting essentially of components adjusted so as to have a composition of 44.0 to 50.0 mol % of $Fe_2O_3$, 4.0 to 26.5 mol % of ZnO, 0.1 to 8.0 mol % of at least one member selected from the group consisting of $TiO_2$ and $SnO_2$, and the remainder being MnO, sintering the resulting green compact in air, and then cooling the green compact in air to obtain Mn—Zn ferrite having an electrical resistance of 150 Ωm or above.

2. A process for producing Mn—Zn ferrite, which comprises pressing a mixed powder consisting essentially of components adjusted so as to have a composition of 44.0 to 50.0 mol % of $Fe_2O_3$, 4.0 to 26.5 mol % of ZnO, 0.1 to 8.0 mol % of at least one member selected from the group consisting of $TiO_2$ and $SnO_2$, 0.1 to 16.0 mol % of CuO and the remainder being MnO, sintering the resulting green compact in air, and then cooling the green compact in air to obtain Mn—Zn ferrite having an electrical resistance of 150 Ωm or above.

3. A process for producing Mn—Zn ferrite, which comprises pressing a mixed powder consisting essentially of components adjusted so as to have a composition of 44.0 to 50.0 mol % of $Fe_2O_3$, 4.0 to 26.5 mol % of ZnO, 0.1 to 8.0 mol % of at least one member selected from the group consisting of $TiO_2$ and $SnO_2$, and the remainder being MnO, sintering the resulting green compact in an atmosphere having an oxygen concentration as defined by the following equation, and then cooling the green compact after sintering the same at a temperature up to at least 300° C. to obtain Mn—Zn ferrite having an initial permeability of 1,500 at 1 MHz or above:

$$\log Po_2 = -14,540/(T+273) + b$$

wherein T is temperature (° C.), $Po_2$ is oxygen concentration, and b is a constant selected from the range of 6 to 21.

4. A process for producing Mn—Zn ferrite, which comprises pressing a mixed powder consisting essentially of components adjusted so as to have a composition of 44.0 to 50.0 mol % of $Fe_2O_3$, 4.0 to 26.5 mol % of ZnO, 0.1 to 8.0 mol % of at least one member selected from the group consisting of $TiO_2$ and $SnO_2$, 0.1 to 16.0 mol % of CuO and the remainder being MnO, sintering the resulting green compact in an atmosphere having an oxygen concentration as defined by the following equation, and then cooling the green compact after sintering the same at a temperature up to at least 300° C. to obtain Mn—Zn ferrite having an initial permeability of 1,500 at 1 MHz or above:

$$\log P_{O_2} = -14{,}540/(T+273) - b$$

wherein T is temperature (° C.), $P_{O_2}$ is oxygen concentration and b is a constant selected from the range of 6 to 21.

* * * * *